(12) United States Patent  
Bae

(10) Patent No.: US 8,537,286 B2  
(45) Date of Patent: Sep. 17, 2013

(54) METHOD FOR CONTROLLING BIDIRECTIONAL REMOTE CONTROLLER AND BIDIRECTIONAL REMOTE CONTROLLER IMPLEMENTING THE METHOD

(75) Inventor: Simon Bae, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 13/177,091

(22) Filed: Jul. 6, 2011

(65) Prior Publication Data

US 2012/0092564 A1    Apr. 19, 2012

(30) Foreign Application Priority Data

Oct. 19, 2010  (KR) .................. 10-2010-0101962

(51) Int. Cl.
*H04N 5/44* (2011.01)
*G08C 19/16* (2006.01)

(52) U.S. Cl.
USPC ........................... 348/734; 340/12.54

(58) Field of Classification Search
USPC ........... 348/734, 569, 552; 340/12.22–12.26, 340/12.29, 12.54, 13.21, 13.31; 725/38, 725/152

See application file for complete search history.

(56) References Cited

U.S. PATENT DOCUMENTS

| | | | | |
|---|---|---|---|---|
| 5,410,326 A * | 4/1995 | Goldstein | .................. | 348/734 |
| 5,545,857 A * | 8/1996 | Lee et al. | .................. | 178/18.03 |
| 6,040,829 A * | 3/2000 | Croy et al. | .................. | 715/864 |
| 6,130,726 A * | 10/2000 | Darbee et al. | .................. | 348/734 |
| 6,380,984 B1 * | 4/2002 | Inoue et al. | .................. | 348/569 |
| 6,407,779 B1 * | 6/2002 | Herz | .................. | 348/734 |
| 6,532,592 B1 | 3/2003 | Shintani et al. | | |
| 6,930,661 B2 * | 8/2005 | Uchida et al. | .................. | 345/87 |
| 7,109,974 B2 * | 9/2006 | Kempisty | .................. | 345/173 |
| 7,831,930 B2 * | 11/2010 | Dresti et al. | .................. | 715/835 |
| 7,840,990 B2 * | 11/2010 | Shintani et al. | .................. | 725/133 |
| 8,054,294 B2 * | 11/2011 | Sakai et al. | .................. | 345/169 |
| 2002/0143805 A1 | 10/2002 | Hayes et al. | | |
| 2003/0169234 A1 | 9/2003 | Kempisty | | |
| 2005/0253808 A1 * | 11/2005 | Yoshida | .................. | 345/156 |
| 2006/0132656 A1 | 6/2006 | Yamamoto et al. | | |
| 2009/0007203 A1 * | 1/2009 | Drazin et al. | .................. | 725/106 |
| 2009/0023389 A1 * | 1/2009 | Paryani | .................. | 455/41.2 |
| 2009/0300620 A1 | 12/2009 | Park et al. | | |

(Continued)

FOREIGN PATENT DOCUMENTS

EP    1 030 517 A1    8/2000

OTHER PUBLICATIONS

Communication dated Oct. 12, 2011, issued by the European Patent Office in corresponding European Patent Application No. 11172125.4.

*Primary Examiner* — Victor Kostak

(74) *Attorney, Agent, or Firm* — Sughrue Mion, PLLC

(57) ABSTRACT

A method for controlling a bidirectional remote controller is provided, which can directly transmit settings desired by a user to a display device. The method for controlling the bidirectional remote controller includes the bidirectional remote controller receiving from a display device and displaying on the display device a menu screen, selecting a menu from the displayed menu screen, and transmitting to the display device at least one of a control command for displaying an active window that corresponds to the selected menu and a control command for executing a function that corresponds to the selected menu on the display device.

11 Claims, 4 Drawing Sheets

(56) References Cited

U.S. PATENT DOCUMENTS

| | | | |
|---|---|---|---|
| 2010/0053469 A1* | 3/2010 | Choi | 348/734 |
| 2010/0118209 A1* | 5/2010 | Hardacker | 348/734 |
| 2010/0156807 A1* | 6/2010 | Stallings et al. | 345/173 |
| 2010/0205628 A1* | 8/2010 | Davis et al. | 725/25 |
| 2011/0191516 A1* | 8/2011 | Xiong et al. | 710/305 |
| 2011/0279375 A1* | 11/2011 | Hatambeiki et al. | 345/169 |
| 2011/0307932 A1* | 12/2011 | Fan et al. | 725/110 |
| 2012/0013536 A1* | 1/2012 | VanDuyn et al. | 345/169 |
| 2012/0033140 A1* | 2/2012 | Xu | 348/734 |

* cited by examiner

METHOD FOR CONTROLLING BIDIRECTIONAL REMOTE CONTROLLER AND BIDIRECTIONAL REMOTE CONTROLLER IMPLEMENTING THE METHOD

PRIORITY

This application claims priority from Korean Patent Application No. 10-2010-0101962, filed on Oct. 19, 2010 in the Korean Intellectual Property Office, the disclosure of which is incorporated herein in its entirety by reference.

BACKGROUND

1. Field

Methods and apparatuses consistent with exemplary embodiments relate generally to a method for controlling a bidirectional remote controller and a bidirectional remote controller implementing the method, and more particularly, to a method for controlling a bidirectional remote controller and a bidirectional remote controller implementing the method, which can control a display device.

2. Description of the Related Art

Generally, a remote controller is a device that remotely controls electronic appliances, such as a television receiver, a DVD (Digital Versatile Disc), a VCR (Video Cassette Recorder), a cable broadcasting device, a set top box, an audio device, and the like through wireless transmission of a control frequency. For this, the remote controller transmits a control signal to a remotely controlled electronic appliance, for example, using an infrared signal.

For example, as illustrated in FIG. 1, a display device 110 unidirectionally receives only a simple signal, such as a channel change signal, a volume control signal, and the like, by a remote controller 120.

However, in controlling a display device 110 such as a television receiver, a menu screen is displayed using an on-screen display (OSD). However, as the functions and complexity of processing and displaying images on the screen are increased, it is inconvenient to input navigation, selection, and characters of OSD on the screen using a remote controller.

For example, since a user is required to search for and set a desired function, such as when reviewing an instruction manual in a display device, the user looks at instruction manual on the screen, exits the OSD containing the instruction manual, and returns to another OSD of the screen to perform the desired operation. Also, there is an increasing need for a special pointing device or character input function in order to perform Internet browsing.

SUMMARY

Aspects of exemplary embodiments address at least the above problems and/or disadvantages and to provide at least the advantages described below. Accordingly, an aspect of an exemplary embodiment provides a method for controlling a bidirectional remote controller and a bidirectional remote controller implementing the method, which can directly transmit settings desired by a user to a display device.

According to an aspect of an exemplary embodiment, there is provided a method for controlling a bidirectional remote controller, the method including the bidirectional remote controller receiving and displaying a menu screen from a display device; selecting a menu from the displayed menu screen; and transmitting at least one of a control command for displaying an active window that corresponds to the selected menu and a control command for executing a function that corresponds to the selected menu on the display device to the display device.

The bidirectional remote controller may be a remote controller that includes a touch screen remote controller or a display unit.

The menu screen may include at least one of an OSD menu screen and an e-manual screen of the display device.

The OSD menu screen may be a screen for setting a screen or sound of the display device.

The menu screen may be received in an Extensible Markup Language (XML) data format from the display device.

The displaying of the active window may include installing a program for configuring the menu screen received in the XML data format in the remote controller.

The method for controlling a bidirectional remote controller may further include receiving a user input from a user; and transmitting data that corresponds to the user input to the display device.

The control command for displaying the active window that corresponds to the selected menu screen on the display device may be a control command for immediately displaying the active window on the display device in the case where any one menu is selected by a user from the displayed menu screen in the remote controller.

Each active window that corresponds to the selected menu may have its inherent identifier (ID), and the control command for displaying the active window that corresponds to the selected menu screen may include the inherent ID.

The transmitting the at least one of the control commands to the display device may include transmitting the control commands that correspond to the plurality of menus individually or collectively when the plurality of menus are selected.

The control command may include a control command for storing the data input by the remote controller in the display device.

According to an aspect of another exemplary embodiment, there is provided a bidirectional remote controller including a reception unit receiving a menu screen for controlling a display device from the display device; a display unit displaying the menu screen received by the reception unit; a function execution unit generating at least one of a control command for displaying an active window that corresponds to the selected menu and a control command for executing a function that corresponds to the selected menu on the display device when at least one menu is selected from the menu screen; and a transmission unit transmitting the generated control command to the display device.

The menu screen may include at least one of an OSD menu screen and an e-manual screen of the display device.

The OSD menu screen may be a screen for setting a screen or sound of the display device.

The reception unit may receive the menu screen in an XML data format from the display device.

The display unit may install the menu screen received in the XML data format in the bidirectional remote controller.

The bidirectional remote controller according to an exemplary embodiment may further include a user command input unit receiving a user input from a user, and the transmission unit may transmit data that corresponds to the user input to the display device.

The transmission unit may transmit a control command for immediately displaying the active window to the display device in the case where any one menu is selected by a user from the displayed menu screen in the remote controller.

Each active window that corresponds to the selected menu may have its inherent ID, and the control command for displaying the active window that corresponds to the selected menu screen may include the inherent ID.

The transmission unit may transmit the control commands that correspond to the plurality of menus individually or collectively when the plurality of menus are selected.

The control command may include a control command for storing the data input by the remote controller in the display device.

According to other exemplary embodiments, a user can directly transmit settings desired by the user to the display device as the user confirms the setting and operation screen of the display device.

BRIEF DESCRIPTION OF THE DRAWINGS

The above and/or other aspects, of the exemplary embodiments will be more apparent from the following detailed description when taken in conjunction with the accompanying drawings, in which.

DETAILED DESCRIPTION OF EXEMPLARY EMBODIMENTS

Hereinafter, exemplary embodiments are described in detail with reference to the accompanying drawings. For reference, in explaining the exemplary embodiments, detailed descriptions of constructions or processes known in the art may be omitted to avoid obscuring the subject matter of the exemplary embodiments.

Figure 1:
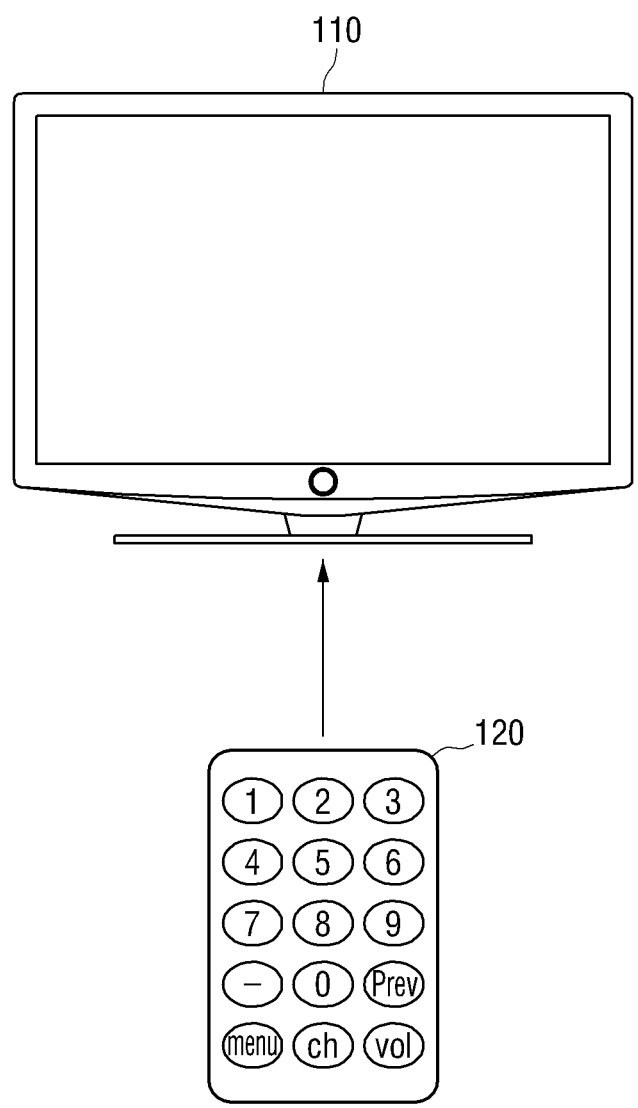
FIG. 1 is a diagram illustrating an example in which a remote controller controls a display device.
Figure 2:
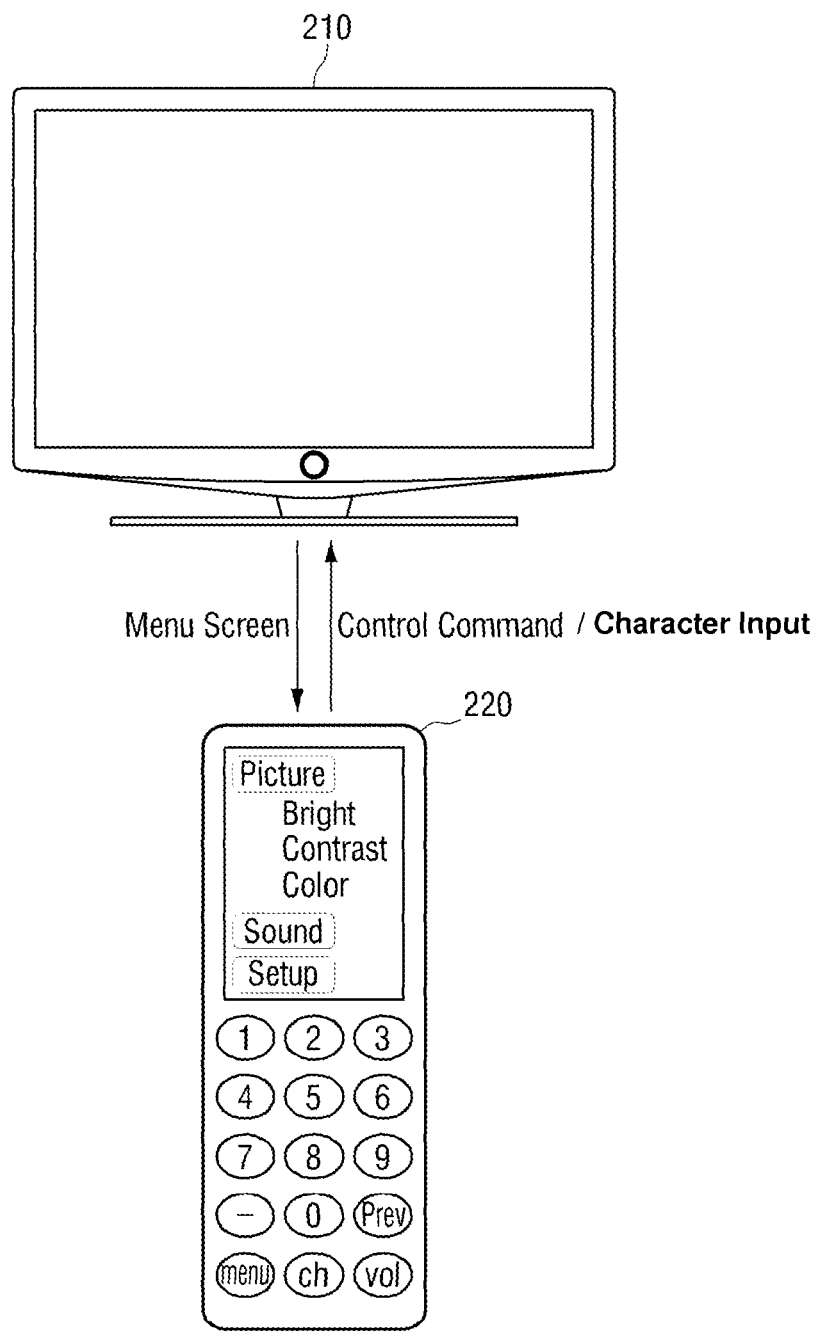
FIG. 2 is a diagram illustrating an example in which a bidirectional remote controller according to an exemplary embodiment controls a display device.

FIG. 2 is a diagram illustrating an example in which a bidirectional remote controller according to an exemplary embodiment controls a display device.

As illustrated in FIG. 2, a bidirectional remote controller 220 according to an exemplary embodiment performs bidirectional communication with a display device 210.

Also, the display device 210 may transmit an OSD menu screen for control of the display device to the bidirectional remote controller 220, and the bidirectional remote controller 220 may transmit a control command for displaying an active window that corresponds to a menu screen selected by a user or a control command for executing a function that corresponds to the menu screen selected by the user to the display device 210.

Accordingly, an OSD menu screen for controlling screen brightness, contrast, and the like is displayed on the bidirectional remote controller.

Figure 3:
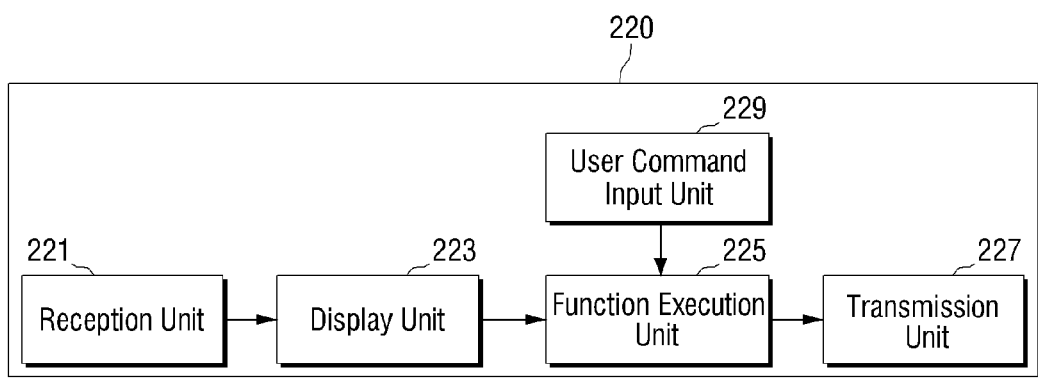
FIG. 3 is a brief block diagram of a bidirectional remote controller according to an exemplary embodiment illustrated in FIG. 2.

FIG. 3 is a brief block diagram of a bidirectional remote controller according to an exemplary embodiment illustrated in FIG. 2. As illustrated in FIG. 3, the bidirectional remote controller 220 includes a reception unit 221, a display unit 223, a function execution unit 225, a transmission unit 227, and a user command input unit 229.

The reception unit 221 receives the menu screen for controlling the display device 210 from the display device 210.

In an exemplary embodiment, the reception unit 221 may receive the menu screen in an XML data format from the display device 210.

Here, the XML data format represents a method for describing schema using an XML (Extensible Markup Language) grammar, and is an XML application for defining metadata schema.

In an exemplary embodiment, the menu screen may include at least one of an OSD menu screen and an e-manual screen of the display device.

Here, the OSD menu screen may be a screen for setting a screen or sound of the display device.

In other words, through the menu screen, the OSD, manual, and the like of the display device 210 that is a main video appliance can be received.

For example, the OSD may be an OSD menu screen for setting a screen or sound of the display device or an e-manual that is a user guide for the display device.

Accordingly, the bidirectional remote controller according to an exemplary embodiment can directly receive the OSD screen for controlling the display device, and can set the screen or sound desired by the user.

The display unit 223 of the bidirectional remote controller 220 outputs the menu screen received by the reception unit 221 from the display device 210.

Here, the bidirectional remote controller 220 may be a remote controller that includes a touch screen or a display unit.

In other words, since the bidirectional remote controller 220 according to an exemplary embodiment receives the OSD screen or the like from the display device 210 and displays the OSD screen on the bidirectional remote controller 220, the bidirectional remote controller 220 should include a display unit such as a touch screen.

Also, in an exemplary embodiment, the display unit 223 of the bidirectional remote controller 220 may install a program in the bidirectional remote controller 220 for configuring the menu screen received by the reception unit 221 in the XML data format.

Accordingly, it is necessary to install the OSD screen received from the display device 210 in the bidirectional remote controller 220 in order to control the display device.

If at least one menu is selected from the menu screen, the function execution unit 225 generates at least one of the control command for displaying an active window that corresponds to the selected menu and the control command for executing a function that corresponds to the selected menu on the display device.

In other words, if the user selects any one of the OSD menu screen or e-manual screen received from the display device 210, the function execution unit 225 generates the control command that executes the function that corresponds to the selected item.

The transmission unit 227 transmits the control command generated by the function execution unit 225 to the display device 210.

In an exemplary embodiment, the transmission unit 227 can transmit the control command for immediately displaying the active window to the display device 210 in the case where any one of the menu screens displayed on the bidirectional remote controller 220 is selected by the user.

In other words, if the user selects any one of diverse menu items on the remote controller, the transmission unit of the bidirectional remote controller according to an exemplary embodiment transmits the control command for immediately displaying the active window that corresponds to the selected menu item on the display device 210 to the display device 210. Accordingly, the user can perform all settings for the screen or sound on the bidirectional remote controller 220 without the necessity of operating the OSD menu screen on the display device 210.

Here, the active window that corresponds to the selected menu screen may have its inherent ID, and the control command for displaying the active window that corresponds to the selected menu screen may include the inherent ID.

In other words, in order to immediately display the active window that corresponds to the menu screen selected on the bidirectional remote controller 220 on the display device 210, the inherent ID such as an index ID is given to each active window that corresponds to the menu screen selected on the bidirectional remote controller 220, and if the inherent ID that displays the active window is included in the control command, the display device 210 immediately displays the active window that corresponds to the inherent ID transmitted from the bidirectional remote controller 220.

In an exemplary embodiment, if a plurality of menus are selected, the transmission unit 227 may transmit the control commands that correspond to the plurality of menus individually or collectively.

In other words, the transmission unit 227 may individually transmit the control command according to the menu selected by the user in the function execution unit whenever the control command is generated, or may collectively transmit the control command to the display device after all settings are completed.

Here, the control command may include a control command for storing the data input by the bidirectional remote controller 220 in the display device 210.

In other words, the control command may include not only the control command according to the menu screen for controlling the display device 210 through the remote controller but also the control command for storing the user input data, such as characters input through the remote controller or setting data changed by the bidirectional remote controller 220, in the display device 210.

The user command input unit 229 receives the user input from the user.

That is, the function execution unit 225 receives the user input for executing a function that corresponds to the menu selected by the user.

In an exemplary embodiment, the transmission unit 227 may transmit the data that corresponds to the user input received by the user command input unit 229 to the display device 210.

For example, the character input data input through the user command input unit can be transmitted to the display device 210.

Also, in an exemplary embodiment, the bidirectional remote controller 220 can perform not only the function of a remote controller for one display device but also the function of an integrated remote controller for a plurality of display devices.

Accordingly, the bidirectional remote controller 220 according to diverse exemplary embodiments can immediately transmit the settings desired by the user to the display device 210 for storage as the user watches the setting and operation explanation of the display device on the remote controller in the case of using contents such as an e-manual or the like. Also, it is possible to freely operate the OSD menu screen on the screen without discriminating the OSD menu screens displayed on the display device. Also, in the case of setting navigation of the OSD menu screen using the bidirectional remote controller 220, the user's input of touch, instruction, character input, and the like, can be freely performed.

Hereinafter, a method for controlling a bidirectional remote controller 220 according to an exemplary embodiment will be described. In the following description, explanation that overlaps the above-described explanation of the bidirectional remote controller according to an embodiment of the invention will be omitted.

Figure 4:
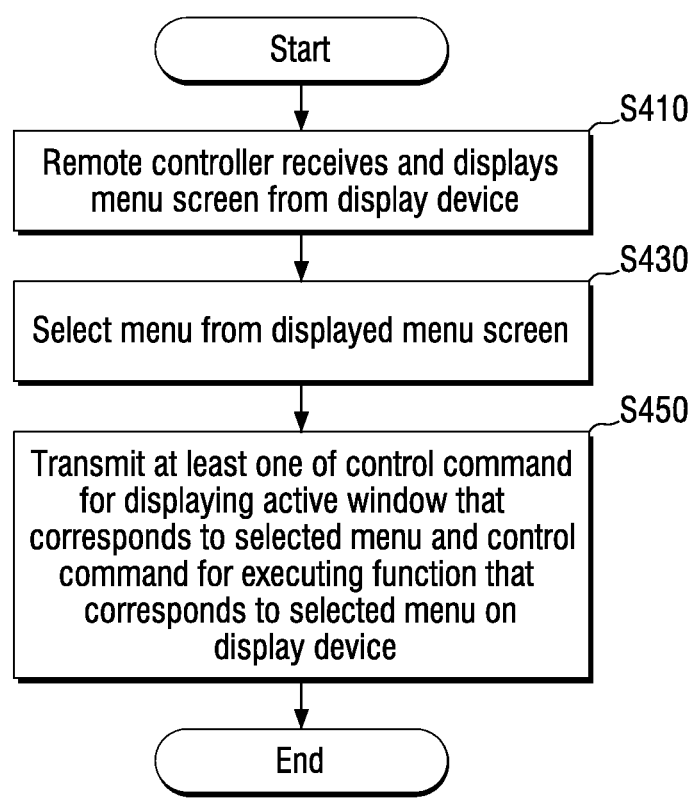
FIG. 4 is a flowchart illustrating a method for controlling a bidirectional remote controller according to an exemplary embodiment.

FIG. 4 is a flowchart illustrating a method for controlling a bidirectional remote controller according to an embodiment of the invention.

First, the bidirectional remote controller 220 receives a menu screen from the display device 210 and displays the menu screen (S410).

Here, the bidirectional remote controller 220 may be a remote controller that includes a touch screen remote controller or a display unit. In other words, since the bidirectional remote controller 220 according to an exemplary embodiment receives the OSD screen or the like from the display device 210 and displays the OSD screen on the bidirectional remote controller 220, it should include a display unit such as a touch screen.

In an exemplary embodiment, the menu screen may include at least one of an OSD menu screen and an e-manual screen of the display device 210.

Here, the OSD menu screen may be a screen for setting a screen or sound of the display device.

In other words, through the menu screen, the OSD, manual, and the like, of the display device 210 that is a main video appliance can be received from the display device 210.

For example, the OSD may be an OSD menu screen for setting a screen or sound of the display device 210 or an e-manual that is a user guide for the display device 210.

Accordingly, the bidirectional remote controller 220 according to an exemplary embodiment can directly receive the OSD screen for controlling the display device 210, and can set the screen or sound desired by the user.

In an exemplary embodiment, the menu screen may be received in an XML data format from the display device 210.

Here, receiving the menu screen from the display device 210 and displaying the menu screen on the bidirectional remote controller 220 may include installing a program for configuring the menu screen received in the XML data format in the bidirectional remote controller 220.

This is because an installation program for displaying the OSD screen received from the display device is required in order to receive the OSD screen for controlling the display device 210 in the bidirectional remote controller 220 and to control the display device 210 accordingly.

Next, a menu is selected from the menu screen displayed in operation S410 (S430).

According to the method for controlling a bidirectional remote controller 220 according to an exemplary embodiment, a user selects any one of the OSD menu screen and e-manual received from the display device 210.

Last, at least one of a control command for displaying an active window that corresponds to the menu screen selected in operation S430 and a control command for executing a function that corresponds to the selected menu on the display device 210 is transmitted to the display device 210 (S450).

Here, the method for controlling a bidirectional remote controller 220 according to an exemplary embodiment may further include receiving a user input from the user and transmitting data that corresponds to the user input to the display device 210.

In an exemplary embodiment, the control command for displaying the active window that corresponds to the selected menu screen on the display device 210 may be a control command for immediately displaying the active window in the case where any one menu is selected by the user from the menu screens displayed on the bidirectional remote controller 220.

In other words, if the user selects any one of diverse menu items on the bidirectional remote controller 220, the control command for immediately displaying the active window that corresponds to the selected menu item on the display device 210 is transmitted to the display device 210. Accordingly, the user can perform all settings for the screen or sound on the bidirectional remote controller 220 without the necessity of operating the OSD menu screen on the display device 210.

Here, the active window that corresponds to the selected menu screen may have its inherent ID, and the control command for displaying the active window that corresponds to the selected menu screen may include the inherent ID.

Therefore, in order to immediately display the active window that corresponds to the menu screen selected on the bidirectional remote controller 220 on the display device 210, the inherent ID such as an index ID is given to each active window that corresponds to the menu screen selected on the bidirectional remote controller 220, and if the inherent ID that displays the active window is included in the control command, the display device 210 immediately displays the active window that corresponds to the inherent ID transmitted from the bidirectional remote controller. 220

In an exemplary embodiment, if a plurality of menus are selected, operation 5450 may transmit the control commands individually or collectively.

In other words, the control command according to the menu selected by the user may be individually transmitted whenever the control command is generated, or may be collectively transmitted to the display device 210 after all settings are completed.

Here, the control command may include a control command for storing the data input by the remote controller in the display device.

In other words, the control command may include not only the control command according to the menu screen for controlling the display device 210 through the bidirectional remote controller 220 but also the control command for storing the user input data, such as characters input through the remote controller or setting data changed by the bidirectional remote controller 220, in the display device 210.

Accordingly, the method for controlling a bidirectional remote controller 220 according to diverse exemplary embodiments can immediately transmit the settings desired by the user to the display device 210 for storage as the user watches the setting and operation explanation of the display device 210 on the remote controller in the case of using contents such as an e-manual or the like. Also, it is possible to freely operate the OSD menu screen on the screen without discriminating the OSD menu screens displayed on the display device 210. Also, in the case of setting navigation of the OSD menu screen using the bidirectional remote controller 220, the user's input of touch, instruction, character input, and the like, can be freely performed.

While the inventive concept has been shown and described with reference to certain exemplary embodiments thereof, it will be understood by those skilled in the art that various changes in form and detail may be made therein without departing from the spirit and scope of the inventive concept, as defined by the appended claims.

What is claimed is:

1. A method for controlling a bidirectional remote controller, the method comprising:
   receiving data for constructing a menu screen from a display device;
   constructing the menu screen by using the received data for controlling the display device;
   displaying the constructed menu screen;
   receiving a character which is input by a user and is related to information of the displayed menu screen; and
   transmitting to the display device the inputted character and a control command for storing the inputted character.

2. The method for controlling the bidirectional remote controller as claimed in claim 1, wherein the bidirectional remote controller includes a touch screen remote controller or a display unit.

3. The method for controlling the bidirectional remote controller as claimed in claim 1, wherein the menu screen comprises at least one of an on-screen display (OSD) menu screen and an e-manual screen of the display device.

4. The method for controlling the bidirectional remote controller as claimed in claim 3, wherein the OSD menu screen is a screen for setting a screen or sound of the display device.

5. The method for controlling the bidirectional remote controller as claimed in claim 1, wherein the menu screen is received in an Extensible Markup Language (XML) data format from the display device.

6. The method for controlling the bidirectional remote controller as claimed in claim 5, wherein the displaying the menu screen comprises installing in the bidirectional remote controller a program for configuring the menu screen received in the XML data format.

7. A bidirectional remote controller comprising:
   a reception unit which receives from a display device data for constructing a menu screen for controlling the display device;
   a display unit which constructs the menu screen by using the received data and displays the constructed menu screen;
   a user command input unit which receives a character which is input by a user and is related to information of the displayed menu screen; and
   a function execution unit which generates a control command for storing the inputted character; and
   a transmission unit which transmits to the display device the inputted character and a control command for storing the inputted character.

8. The bidirectional remote controller as claimed in claim 7, wherein the menu screen comprises at least one of an on-screen display (OSD) menu screen and an e-manual screen of the display device.

9. The bidirectional remote controller as claimed in claim 8, wherein the OSD menu screen is a screen for setting a screen or sound of the display device.

10. The bidirectional remote controller as claimed in claim 7, wherein the reception unit receives the menu screen in an Extensible Markup Language (XML) data format from the display device.

11. The bidirectional remote controller as claimed in claim 10, wherein the display unit installs the menu screen received in the XML data format in the bidirectional remote controller.

* * * * *